United States Patent [19]

Moulton

[11] 3,802,686

[45] Apr. 9, 1974

[54] VEHICLE SUSPENSION UNIT

[75] Inventor: Alexander Eric Moulton, Bradford-on-Avon, England

[73] Assignee: Moulton Developments Limited, Bradford-on-Avon, Wiltshire, England

[22] Filed: Dec. 18, 1972

[21] Appl. No.: 316,274

[30] Foreign Application Priority Data

Dec. 31, 1971  Great Britain................... 60979/71

[52] U.S. Cl.............................................. 267/65 B
[51] Int. Cl............................................... F16f 5/00
[58] Field of Search....... 267/65 BV, 65 RV, 64 RV

[56] References Cited
UNITED STATES PATENTS 3,038,716  6/1962  Brown et al...................... 267/65 B
2,984,476  5/1961  Turner............................. 267/65 B Primary Examiner—James B. Marbert
Attorney, Agent, or Firm—Shoemaker and Mattare

[57] ABSTRACT

The invention relates to a rubber flap type damper valve for use in controlling liquid flow in a hydraulic suspension unit, each rubber flap of the valve being pre-compressed by rigid means into engagement with a ported wall to cover port means in the wall, the rigid means in conjunction with the wall bearing against and confining the major part of the external surface of the rubber flap so that when the flap deforms in response to liquid pressure to at least partially uncover its associated port means, such deformation takes place primarily in compression.

The invention further relates to a hydro-pneumatic suspension unit incorporating such a rubber flap type damper valve.

7 Claims, 9 Drawing Figures

Fig. 2.
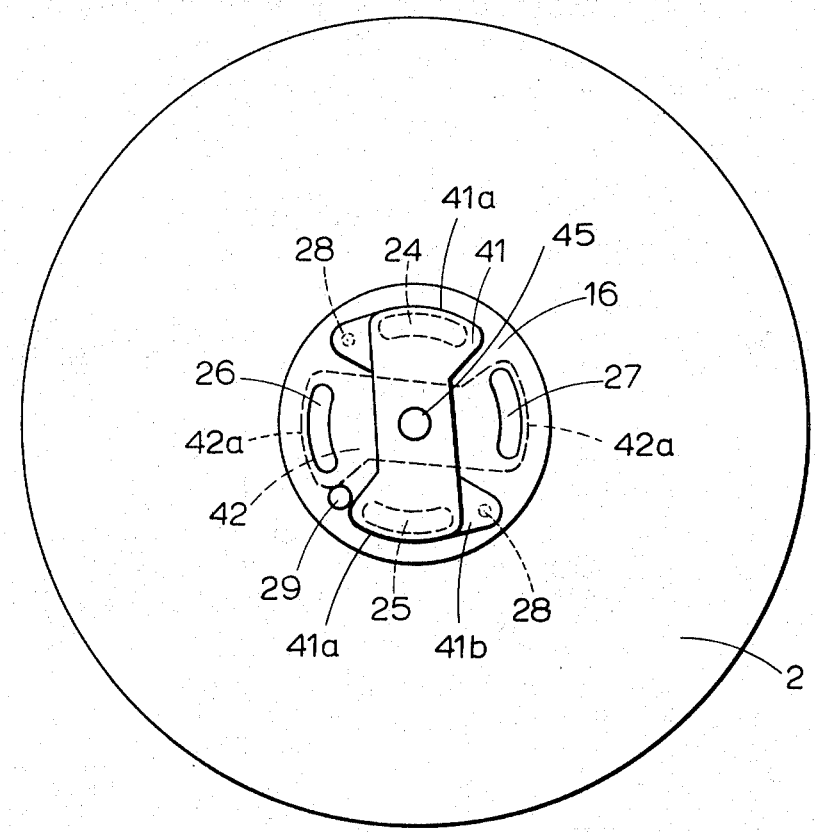
Fig. 3.
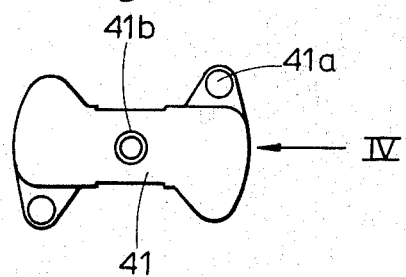
Fig. 4.

VEHICLE SUSPENSION UNIT

This invention relates to vehicle suspension units of the kind employing pressure fluid systems.

The invention is particularly directed to units incorporating rubber flap type damper valves for controlling fluid flow and the invention is also concerned with suspension units incorporating such valves.

Vehicle wheel resilient suspension units are known and have been used for many years of the kind incorporating a diaphragm type displacer chamber, and in liquid flow communication therewith, a hydraulic accumulator spring chamber.

Examples of such resilient suspension units are described in British Patent Specification Nos: 848,996 and 942,829. A further example is described in the Specification of German Offenlegungschrift No. 21 05879 published 5th August, 1971.

Diaphragm type hydraulic displacer chambers have been employed for many years in vehicle wheel suspension units. In typical form these comprise a chamber bounded in part by a concave annular metal casing member and in part by a circular flexible textile reinforced rubber or rubber-like diaphragm, whose peripheral beaded rim is trapped by a bent over metal lip at the widest part of the metal casing member. Also trapped by said lip is the widest part of a tapered annular skirt of general frustoconical form. Bearing on the central zone of the diaphragm is a piston member having flanks which are tapered and may be generally frustoconical, the tapers of the piston flanks and of the skirt being oppositely directed. The chamber is liquid filled and port means are provided in the wall of the metal member through which liquid flows on variation of the volume of the chamber when the piston moves towards or away from the metal member. The oppositely directed tapers of the piston flanks and skirt control the movements in flexing of the diaphragm during piston movements (it being understood that the metal member is in effect stationary relative to the piston) in such manner as to endow the displacer with a rate. By this is meant that variation of the volume of the chamber is at a progressive rate for constant rates of movement of the piston and specifically as the piston moves inwardly of the displacer chamber over successive increments of distance, progressively increasing volumes of liquid are displaced from the chamber. Such a displacer unit is referred to hereinafter as a "diaphragm-type hydraulic displacer unit."

Hydraulic accumulator springs have also been employed for many years in vehicle wheel suspension units. Briefly, such a spring comprises a chamber of variable volume bounded at least in part by a resiliently deformable wall, the chamber being always completely full of hydraulic liquid, with increase in the volume of the chamber causing resilient deformation of the elastic wall.

In such hydraulic accumulator spring units there may be employed as resilient medium, either a gas under pressure, in which case the deformable wall comprises a membrane separating the gas from the liquid, or a body of rubber or rubber-like elastomeric material.

However, the present invention is particularly concerned with the provision of rubber flap type damper valve means arranged to control flow between a diaphragm type displacer chamber and an hydraulic accumulator spring chamber in a resilient suspension unit.

Examples of rubber flap type damper valve means are also known in the art. In prior British Patent Specification No. 824,371, there is described a rubber flap type damper valve comprising an apertured plate and flaps or discs on each side of the plate respectively adapted to obturate flow in one direction through the apertures or ports in the plate whilst flow in the opposite direction is permitted, with the rubber flaps or discs being resiliently deformed by bending.

However, when such rubber flaps, adapted to bend, are employed in high pressure systems, that is when the liquid pressures encountered are in excess of say, 6 atmospheres (90 lbs. per square inch), it has been found difficult to obtain consistent control of liquid flow. This is because the bending flaps respond to low difference in fluid pressure across them and do not reliably obturate the ports in conditions of fluctuating pressure where low flow velocities are encountered through the ports.

The present invention has for a particular object to provide an improved rubber flap type damper valve for use in controlling hydraulic flow in vehicle suspension units, in that the damper valve enables greater control to be had of the fluid flow and hence of the ride characteristics of the vehicle to which the suspension unit is fitted.

Broadly stated, this invention provides a rubber flap type damper valve for use in controlling liquid flow in a hydraulic suspension unit, each rubber flap of the valve being pre-compressed by rigid means into engagement with a ported wall to cover port means in the wall, the rigid means in conjunction with the wall bearing against and confining the major part of the external surface of the rubber flap so that when the flap deforms in response to liquid pressure, to at least partially uncover its associated port means, such deformation takes place primarily in compression.

According to a further feature of the invention the valve comprises two flaps arranged disposed at substantially 90° to one another, on opposite sides of the ported wall and the flaps are pre-compressed against the wall by two shaped metal members, one behind each resilient flap, the metal members being interconnected by spigot means passing through a contral hole in the ported wall.

Preferably, the two shaped metal members are differently contoured in such manner that each imparts a distinct controlling influence on the deflection of its associated resilient flap, whereby the resistance to flow exerted by one of the flaps is greater than that exerted by the second flap. Optionally, also one of the flaps controls more aperatures or more port area than is controlled by the other flap.

Advantageously, also, the ported wall has a further port or ports not covered by the resilient valving flaps, through which flow can freely take place in each direction, this port or ports constituting bleed porting, the area of the bleed porting being less than the area of porting controlled by either of the valving flaps.

By the term "RUBBER" in this specification we mean natural rubber or rubber-like elastomeric materials.

According to a further aspect of this invention, there is provided a resilient suspension unit incorporating such a rubber flap type damper valve with flaps adapted to be resiliently deformed primarily in compression. Such a unit comprises in combination a diaphragm type hydraulic displacer chamber and in liquid flow communication therewith, a hydraulic accumulator spring chamber, the two chambers being located one on each side of a rigid separating wall and including rubber flap damper valve means for controlling liquid flow between the chambers through ports in the separating wall, said damper valve means comprising a first rubber flap, which is located in the spring chamber and covers a first set of ports to prevent flow from the spring chamber to the displacer chamber, while being resiliently deformable to permit flow in the opposite direction, and said damper valve means further comprising a second rubber flap which is located in the displacer chamber and covers a second set of ports to prevent flow from the displacer chamber to the spring chamber while being resiliently deformable to permit flow in the opposite direction, characterised in that both the rubber flaps are pre-compressed by being sandwiched between profiled rigid plates and said separating wall, said plates and said wall bearing against and confining the major part of the external surface of the respective rubber flaps so that they are yet further compressed when resiliently deformed to permit flow through the ports which they cover.

According to a preferred feature of this suspension unit, the valve flap disposed in the spring chamber has two small flap-like projections adapted to cover small holes in the separating wall, such as to impede or prevent flow in one direction but to permit flow out of the displacer chamber with the small projections being deformed in bending and responding to small fluctuations in liquid pressure differences across the separating wall.

The main body portion of each flap, on the other hand, as it is deformable only or mainly in compression will only be so deformed when significant pressure differences arise, that is, of at least one-third atmosphere (5 lbs. per square inch).

The invention will be described with reference to the accompanying drawings in which- FIG. 1 is a cross-sectional view of part of a hydropneumatic vehicle wheel suspension unit according to this invention.

FIG. 2 is a cross-sectional view taken on the lines II-III of FIG. 1.

FIG. 3 is a plan view of one of the valving flaps

FIG. 4 is an end view taken in the direction of the arrow IV of FIG. 3.

Figure 1:
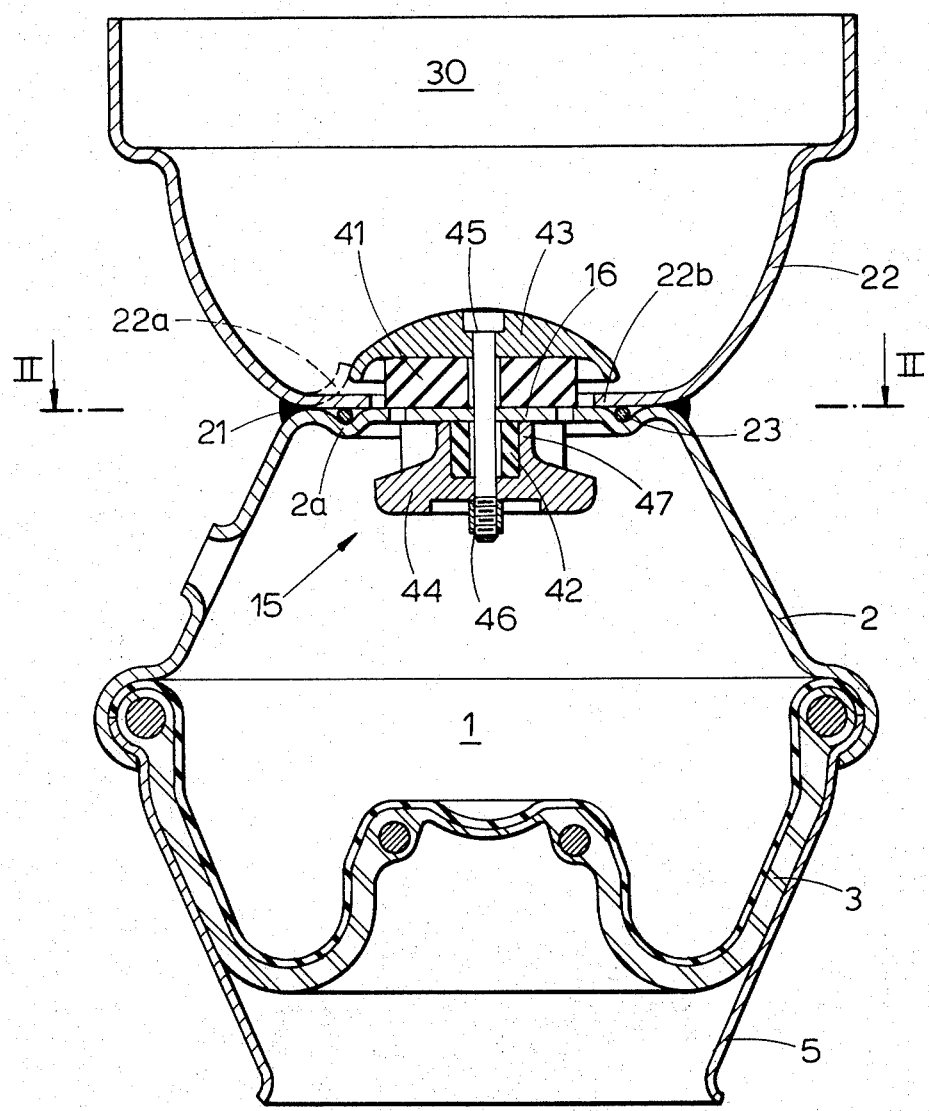

The hydro-pneumatic suspension unit shown partly in FIG. 1 and in FIG. 3 has a displacer chamber 1 bounded in part by a rigid metal casing member 2 and in part by a flexible diaphragm generally designated 3 acted upon by a piston, 10. The construction of the diaphragm 3, of the piston and of a skirt element 5 is of known form.

The metal casing, 2, is joined by a weld at 21 to a second metal casing member 22 which forms part of a hydro-pneumatic accumulator spring chamber generally designated 30. This hydro-pneumatic spring chamber is completed by a further concave metal casing member 31 and the interior of the spring chamber 30 is separated from a further chamber 32 (FIG. 6) by a flexible impervious emembrane, 35. The chamber 32 is filled with gas under pressure while the chambers 1 and 30 are completely filled with liquid under pressure. The initial charging pressures for the gas liquid in the unit may, for example be, say, 15 atmospheres (225 lb./sq. in.).

Referring to FIG. 1, the casing 22 has a large central single opening. The other casing, namely the casing 2, is substantially flat in its central region and has formed therein a series of apertures or ports which will be described in greater detail below with reference to FIG. 2.

Figure 6:
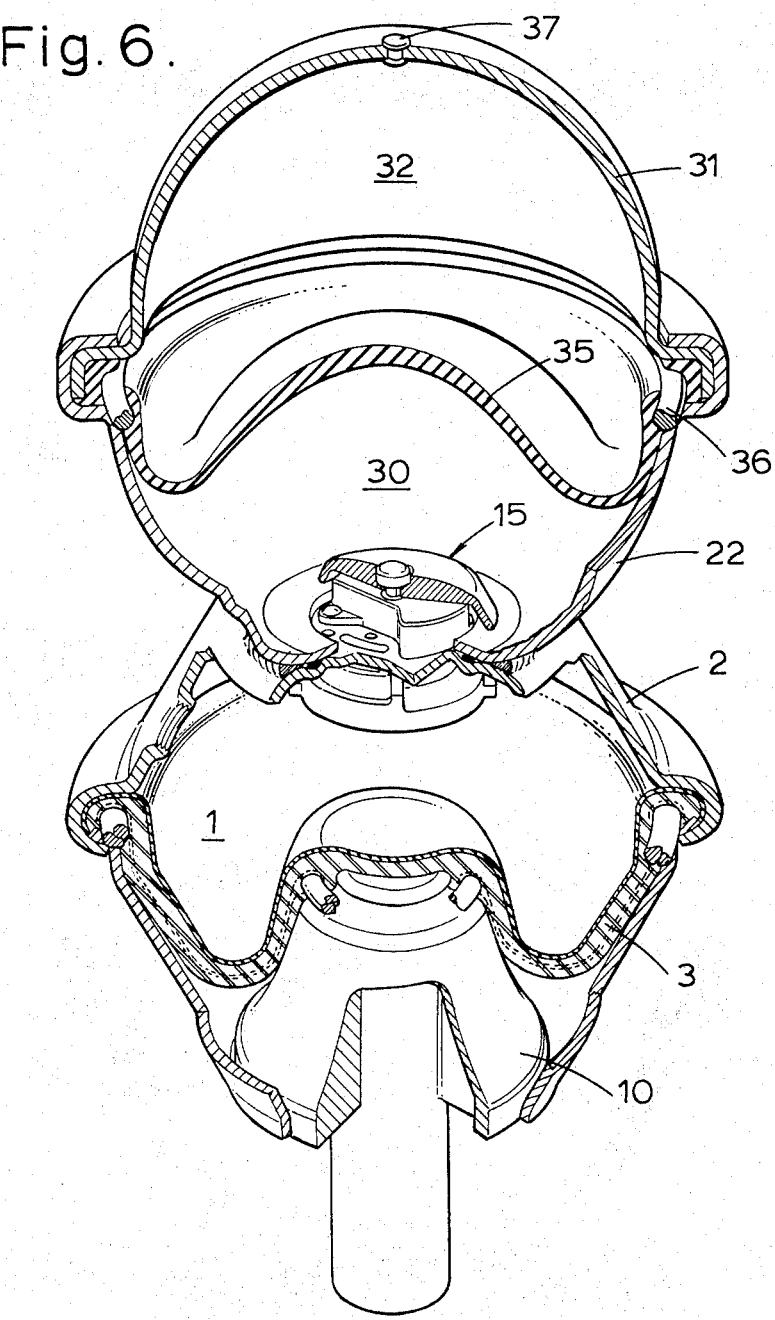
FIG. 6 is an elevational partly cut-away view of the complete suspension unit, part of which is shown in FIG. 1.

A damper valve assembly generally designated 15 in FIGS. 1 and 6 is secured to this central flat region of the casing 2, which region is generally designated 16 in FIG. 1.

The valve assembly according to the present invention comprises a pair of resilient flaps 41 and 42 carried one on each side of the central region 16. Each resilient flap is elongate and the two flaps 41 and 42 are held disposed at substantially 90° to one another on opposite sides of the central region 16 by two profiled or shaped metal plate members 43 and 44 respectively. The metal members 43 and 44 are interconnected by a spigot 45 passing through a central hole in region 16 and 46 represents a washer pinched on to the end of spigot 45 to secure the metal members 43 and 44 in position. Each member 43 and 44 has legs indicated at 47 in FIG. 1 embracing and confining its associated resilient flap 41 or 42 and bearing against the central region 16 of casing 2.

Referring now to FIG. 2, the resilient flap 41 is shown in full lines, while resilient flap 42 is shown in dotted lines. The flaps 41 and 42 are of rubber or rubber like material and it will be seen that the flap 41 covers a pair of elongate ports or apertures 24 and 25 in the central region of the casing 2. The flap 42 on the opposite side of the central region 16 covers a further pair of elongate ports or apertures 26 and 27.

In the embodiment shown and, as will be clear from FIGS. 2, 3 and 4, the flap 41 has a pair of small subsidiary flaps, 41b and these cover small holes 28 in the central region 16 of the casing 2.

The central region 16 of casing 2 also has a further hole 29, which is not covered either by the resilient valving flap 41 or the resilient valving flap 42.

It will be clear from a study of the drawings that flow of fluid from the displacer chamber into the spring chamber 30 takes place through the ports or apertures 24, 25 and 28 and is resiliently resisted by the valving flap 41, the flow through the small apertures 28 being resisted to a lesser extent than the flow through the larger apertures, 24 and 25. Flow out of the chamber 30 takes place through the apertures 26 and 27 and is resisted by valving flap 42. Flow in both directions freely takes place through port 29 which constitutes a bleed port.

Figure 5:
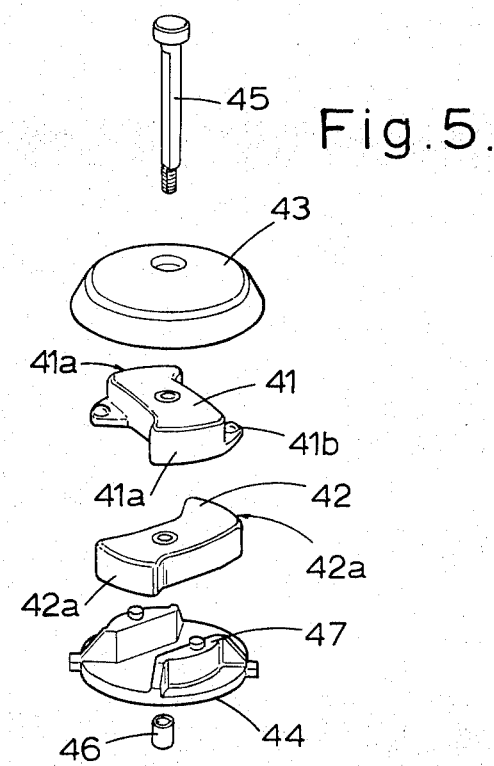
FIG. 5 is an exploded view of the components constituting the damper valve assembly.
Figure 5A:
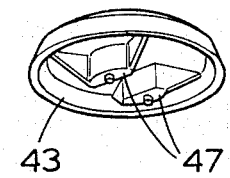
FIG. 5A is a bottom view of the metal member 43.

However, an essential feature of the invention is that the valving flaps 41 and 42 are precompressed by being sandwiched between the profiled metal plate members 43 and 44 and the ported separating wall, region 16. Moreover, the flaps 41 and 42 are confined over the major part of their external surfaces, so that, referring to FIGS. 1 and 5 substantially only the surface regions 41a of the flap 41 are free and, referring to FIGS. 2 and 5, substantially only the surfaces 42a of the flap 42 are free.

Due to this confining of the flaps, when they resiliently deform to allow flow movements, such deformation takes place in compression. This factor, in conjunction with the factor that the flaps are in any case precompressed against the ported wall region, 16, enables the flaps effectively to cover and seal off the elongate apertures 24, 25 and 26, 27 respectively associated with the two flaps. Not only will the flaps effectively seal off these apertures when substantially equal pressures pertain in the chambers 1 and 30, but the apertures will remain closed during small pressure fluctuations and the low fluid flow velocities occasioned can be accommodated by port 29. Further additional flow into the chamber 30 is accommodated by the small port 28 covered by the subsidiary non-compressed flaps 41b.

Only when larger flow velocities are required to take place that is, when the pressure differential between the chambers 1 and 30 exceeds $m$ say one-third atmosphere (5 lbs. per square inch) will the flap 41, or the flap 42, in dependence upon the direction of flow, be resiliently deformed in compression to permit flow through the ports which it covers. Preferably, the two shaped metal members 43 and 44 are differently contoured in such manner that each imparts a distinct controlling influence on the deflection of its associated resilient flap 41 or 42 respectively. In this way, the resistance to flow exerted by one of the valving flaps is greater than that exerted by the other.

To this end, the valving flap 42 will be precompressed to a substantially greater extent than the flap 41. This may be achieved by making the depth of the confining legs, 47, of the profiled plate 44 less than that of the corresponding legs on the plate 43. Alternatively, the flap 42 could have greater depth than the flap 41.

Reference will now be made to the manufacture and assembly of the valve assembly and associated parts of the unit so far as described and illustrated in the drawings.

The casing 2 is manufactured as a metal pressing substantially in the shape shown in FIG. 1. The casing 22 is manufactures as a concave annular metal pressing but, initially, its inner annular lip is turned inwardly as indicated at 22a. in FIG. 1. The casings 2 and 22 are then placed in register and the weld 21 effected. An O-ring 23 is then inserted in dimple 2a formed in casing 2. The lips of the casing 22 are then bent over to adopt the position indicated at 22b in FIG. 1.

The O-ring 23 ensures a hermetic seal between the casings 2 and 22.

Prior to the diaphragm 3 being positioned, the valve assembly is located on opposite sides of the central region 16. The spigot 45 is passed through metal member 43, valve bodies 41 and 42 and metal member 44. The legs 47 of the metal member 43 and 44 are urged against the central region 16 of casing 2 and finally a washer 46 is locked on spigot 45.

Thereafter, the diaphragm 3 is attached to the outer periphery of casing 2 and casing 31 is attached to the casing 22 in such manner, as shown in FIG. 6, as to trap the periphery of the separator 35 between the junction of the casings 22 and 31 and the metal ring 36.

Gas under pressure is introduced into chamber 32 by way of a charging plug 37 and 38 represents a port in casing 2 through which liquid can be introduced completely to fill chambers 1 and 30.

When the chamber 32 is charged and in the absence of counter pressure in chambers 1 and 30, the separator 35 will lie against the plate member 43 of the valve 15. In order to prevent damage to the separator of the plate member 43 has a smooth domelike surface and has a counter sunk recess for the head of the spigot 45.

The suspension unit above described is adapted to be connected between sprung and unsprung elements in a vehicle road wheel suspension arrangement. The sprung element in such an arrangement will usually be the body structure or a so-called sub-frame of the vehicle. The unsprung element will usually be an arm which, at or towards one of its ends, is pivotally mounted on the sprung structure of the vehicle, the arm being connected, at or towards its opposite end, to move in correspondence with rising and falling movements of the associated road wheel relative to the body structure.

Accordingly, the displacer chamber casing 2 will be connected to the body structure of a vehicle while the piston 10 will be connected to move with a road wheel suspension arm.

Figure 7:
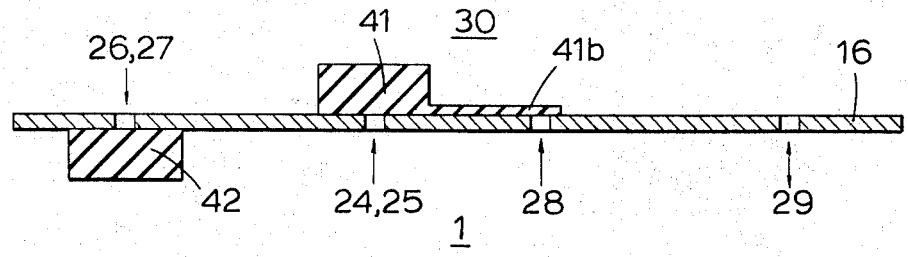
FIGS. 7 and 8 are diagrammatic illustrations showing the operation of the damper valve.

As the road wheel rises and falls relative to the vehicle body, liquid will be displaced from and be returned to the displacer chamber 1. Liquid entering and leaving the spring chamber has to pass through the ports in central region 16 of casing 2. Thus referring to the diagrammatic showing in FIG. 7, low flow velocities in both directions will be accommodated and damped by the bleed port 29. Additional flow into the chamber 30 can take place through the small port 28, with the small bending flaps 41b. preventing flow from the chamber 30 through the small ports 28. Only when significant pressure differences arise in the chambers 1 and 30, will the main flaps 41 and 42 be deformed in compression.

It will be appreciated that by appropriate sizing of the various ports and by arranging appropriately the precompression of the flaps 41 and 42 and the operating characteristics of the valve can be adjusted as desired.

Figure 8:
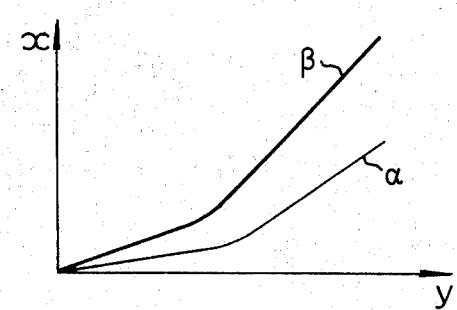

In a typical example, as illustrated diagramatically in FIG. 8, the valve will be arranged to impede flow out of chamber 30 by about twice the extent that flow into chamber 30 is impeded, when high flow velocities are occasioned. In FIG. 8, the $x$ axis represents the effective degree of damping and the $y$ axis represents the flow velocity through the valve. The Alpha curve represents flow into chamber 30 (bump flow) while the Beta curve represents flow out of chamber 30 (rebound flow).

From the foregoing description it will be appreciated how the desired shaping may be given to these curves by adjustment of the shapes and dimensions of the ports 24 to 29, of the valve flaps 41 and 42 and of the confining plates 43 and 44.

We claim:

1. A flap type damper valve for use in controlling liquid flow in a hydraulic suspension unit comprising, a rigid, ported wall, a pair of flaps of elastomeric material secured on opposite sides of the wall in covering relationship to the port means therethrough, rigid flap retaining means engaged with a major part of the external surface of each flap, each flap of the valve being pre-compressed by said rigid means into engagement with said ported wall to cover the port means in the wall, the rigid means in conjunction with the wall bearing against and confining the major part of the external surface of the flaps so that when the flaps deform in response to liquid pressure to at least partially uncover their associated port means, such deformation takes place primarily in compression.

2. A valve according to claim 1 wherein two flaps are arranged disposed at substantially 90° to one another, on opposite sides of the ported wall and the flaps are pre-compressed against the wall by two shaped metal members one behind each resilient flap, the metal members being interconnected by spigot means passing through a central hole in the ported wall.

3. A valve according to claim 2 wherein the two shaped metal members are differently contoured in such manner that each imparts a distinct controlling influence on the deflection of its associated resilient flap, whereby the resistance to flow exerted by one of the flaps is greater than that exerted by the second flap.

4. A valve according to claim 1 wherein the ported wall has a further port or ports not covered by resilient valving flaps, through which flow can freely take place in each direction, this port or ports constituting bleed porting, the area of the bleed porting being less than the area of porting controlled by the valving flaps in combination.

5. A valve according to claim 1, wherein the elastomeric material is rubber.

6. A resilient suspension unit comprising in combination a diaphragm-type hydraulic displacer chamber, and in liquid flow communication therewith, a hydraulic accumulator spring chamber, the two chambers being located one on each side of a rigid separating wall, and including damper valve means for controlling liquid flow between the chambers through ports in the separating wall, said damper valve means comprising a first rubber flap, which is located in the spring chamber and covers a first set of ports to prevent flow from the spring chamber to the displacer chamber while being resiliently deformable to permit flow in the opposite direction, and said damper valve means further comprising a second rubber flap which is located in the displacer chamber and covers a second set of ports to prevent flow from the displacer chamber to the spring chamber while being resiliently deformable to permit flow in the opposite direction, . . . characterised in that both the rubber flaps are pre-compressed by being sandwiched between profiled rigid plates and said separating wall, said plates and said wall bearing against and confining the major part of the external surfaces of the respective rubber flaps to that they are yet further compressed when resiliently deforming to permit flow through the ports which they cover.

7. A suspension unit, according to claim 6, wherein the valve flap disposed in the spring chamber has two small flap-like projections adapted to cover small holes in the separating wall, such as to impede or prevent flow in the direction out of the spring chamber but to permit flow into the spring chamber with the small projections being deformed in bending and responding to small fluctuations in liquid pressure differences across the separating wall, and wherein the main body portion of each flap on the other hand, as it is deformable only or mainly in compression will only be so deformed when significant pressure differences arise, that is, of at least 5 lbs. per square inch.

* * * * *